United States Patent [19]

Morrin, II

[11] 4,124,871

[45] Nov. 7, 1978

[54] IMAGE DATA RESOLUTION CHANGE APPARATUS AND PROCESS UTILIZING BOUNDARY COMPRESSION CODING OF OBJECTS

[75] Inventor: Thomas H. Morrin, II, San Jose, Calif.

[73] Assignee: International Business Machines Corporation, Armonk, N.Y.

[21] Appl. No.: 829,387

[22] Filed: Aug. 31, 1977

[51] Int. Cl.$^2$ .............................................. H04N 1/22
[52] U.S. Cl. ...................................... 358/287; 358/77; 358/96; 358/166; 358/260; 340/146.3 AE; 340/146.3 MA; 340/324 AD
[58] Field of Search .................... 358/287, 77, 180, 96, 358/166, 260; 340/146.3 AE, 146.3 MA, 324 AD

[56] References Cited

U.S. PATENT DOCUMENTS

| 3,541,511 | 11/1970 | Gemchi et al. | 340/146.3 AC |
| 3,987,412 | 10/1976 | Morrin | 340/146.3 AE |
| 4,020,462 | 4/1977 | Morrin | 340/146.3 AE |
| 4,075,658 | 2/1978 | DeCosmac et al. | 358/96 |

Primary Examiner—Robert L. Griffin
Assistant Examiner—Edward L. Coles
Attorney, Agent, or Firm—James A. Pershon

[57] ABSTRACT

Resolution or size changing of scanned objects can be accomplished on contour coded data using the information obtained in the boundary following of exterior and interior borders of objects. The compressed boundary following data has its resolution changed by scale factor multiplying after decoding. The rescaled image is placed into a memory store for display. Uncompressed data is resolution changed by boundary following the stored image to obtain the object boundary coordinates. These coordinates are concurrently multiplied by a scale factor, compared to the scaled coordinate of the previous boundary picutre element and either contour encoded to compress the shrunken image or directed to a second memory store for display. The coordinates of each successive point are changed by the multipliers that scale the coordinates by the consolidation ratios. Each coordinate is affected separately. Any rational reduction factor can be achieved.

11 Claims, 8 Drawing Figures

DECOMPRESSION MODE

FIG.7

COMPRESSION MODE    FIG. 6

IMAGE DATA RESOLUTION CHANGE APPARATUS AND PROCESS UTILIZING BOUNDARY COMPRESSION CODING OF OBJECTS

BACKGROUND OF THE INVENTION

This invention relates generally to facsimile image data compression and, in particular, to border-following compression including a resolution changing apparatus and process.

1. Field of the Invention

Data compression is necessary in order to store the coded points in any two dimensional array representative of a black/white image since the amount of data received is so large as to exceed the boundaries of any reasonable cost memory store. In the prior art, the image is scanned and the data received is compressed in some fashion such as a predictive run length encoding in order to substantially decrease the amount of data necessary for a successful reproduction. More recently data compression has been accomplished utilizing boundary following of the exterior and interior borders of objects. The image is considered to be a two-dimensional array of points each of which exhibit a Boolean value representative of a black or white picture element. A cluster of black elements is defined as an object if it possesses a single outer boundary closing upon itself.

A contour coded image is a list of objects. Each entry in the list is an object, its location and shape precisely described in the chain coded format. Any hole possessed by a given object is described by subordinate chains by that particular entry. The chain header, in addition to specifying object location, may contain information as to structure for order list-type applications.

This coded data by virtue of its organization by entity can be processed in ways that cause meaningful image manipulation operations to be realized. This category of operations are called information preserving in that the contours are not irreversibly modified. Examples of this include rotation of images, editing or merging images, and form removal. Some of these operations may involve the irreversible deletion of entire contours, but they are still called manipulation functions.

A second class of operations that may be conveniently performed in the contour domain is called image processing and is characterized by an irreversible modification of the contours themselves. Examples of these operations include noise removal, smoothing, skeletonization (that is, thinning) and resolution changing. A method and apparatus for the contour resolution change of the compressed data information utilizing boundary following is the subject of this invention.

A resolution changing operation is frequently required at an input/output device. If an image is scanned, it may be desirable to store the image at a resolution different from that of the sensor device. It may also be desirable to print or display an image on a device whose resolution is different from the stored image resolution. The mechanism must be able to change resolutions by any reduction or expansion ratio. That ratio must be dynamically selectable.

2. Description of the Prior Art

A compression method and apparatus for black/white images is known as contour coding and is the subject of a U.S. Pat. No. 3,987,412 assigned to the assignee of the present invention. Briefly, the encoding process of that patent involves locating all of the edges in an image and chain coding these picture elements as objects and boarders of a whole in a systematic manner. A chain is a series of moves from image point to neighboring image point. In the patent, the chain moves around the border. Images are encoded and reconstructed by means of a border follower. The encoded images are stored in a random access addressable image memory.

The notion of boundary encoding, as suggested above, of the outer contours of black objects on a white background is not new. Methods for acheiving these results may be found in Rosenfield, "Picture Processing by Computer," Academic Press, New York, Library of Congress 78-84255, at pages 134-138. Also one may find methods in the literature which locates an organized list of object boundary contours. However, most of the methods appear to operate on grey scale information. The few black/white algorithms appearing in the literature are at least partially raster based thus requiring many passes over the entire array. Typically, the piror art methods require several bits of storage for each picture element being processed.

In the prior art, the resolution changing operations have been implemented for conversion ratios that are integers only. A two to one consolidation is done by taking each two by two block of picture elements and generating a single resultant picture element based on a "majority" among the four input picture elements. This is accomplished in the prior art, for example, on a scanning device where the scan head resolution is double the resolution that is desired for storage.

It is, therefore, a primary object of the present invention to provide a universal resolution changing mechanism for use with a contour coding apparatus that has the ability to change resolutions by any dynamically selectable reduction ratio.

SUMMARY OF THE INVENTION

In accordance with the present invention, a contour coding based mechanism is propsed for reproducing an image at a size different from the stored description of the image. To reproduce an image at a resolution different from its stored description and contour form, the location addresses of the picture elements (PELs) in the object borders of a two dimensional picture are multiplied by a scale factor and each picture element is returned to a storage device according to the new location addresses.

Outputting an image that is available in compressed form at a different resolution involves scaling the object border prints as they are decoded and placed into the image memory. The boundary encoded compressed data is decoded and location addresses are generated from decoded boundary data. The generated location address is multiplied by a scale factor according to the size change desired and the object data is then returned to a storage device at the scaled position. The resolution changed image can then be retrieved from the store and displayed on a display device.

The process according to the present invention for changing the resolution of uncompressed image information during the contour compression process takes the location address of each picture element scanned during the boundary following process and multiplies that location address by a scale factor to generate a new location address. The resulting moves are encoded and placed into a storage device thereby accomplishing a resolution change during the contour compression process.

For output devices, the resolution change mechanism takes effect as the object borders are placed into the image memory. Each picture element is written into the image memory under control of the coordinate position. The coordinates of each successive picture element are changed by multipliers that are individual to each coordinate. In a two-dimensional image, two coordinates $i$ and $j$ address and locate each individual picture element. The multipliers scale the coordinate position by the required consolidation ratio. The resulting contour is then filled in to complete the object image in a manner determined according to the original contour coding.

The resolution changing process of this invention is operable only for a resolution reduction since a resultant chain of data that was larger than the original chain would have gaps that would prohibit reconstruction of an object. A resolution increase can be achieved together with the present invention by first expanding the data chain by its integer value and then reducing it to the desired size by the resolution technique of the present invention. Enlarging a data chain by an integer factor can be accomplished by replacing each move along the contour by $n$ number of moves in the same direction. The image manipulation/processing functions of the present invention are implemented in the contour domain.

It is, therefore, an object of the present invention to provide an enhanced method and apparatus for resolution changing contour coded data.

Another object of the present invention is to provide a method and apparatus that accomplishes a resolution change of either an image that is in the process of undergoing contour compression encoding or an image that is stored in a memory store awaiting decompression after undergoing image data compression according to the contour encoding scheme.

Yet another object of the invention is to provide a resolution size change of a stored compressed image by multiplying the coordinate address location of each object border element by a scale factor and re-encoding the resulting differential moves.

Still another object of the present invention is to accomplish any scale factor size increase in the resolution of the image data by expanding the data chain by an integer value and then reducing the data chain by multiplying the coordinates of each successive picture element of the image by a required scale factor.

These and other objects of the present invention will become apparent to those skilled in the art as the description proceeds.

BRIEF DESCRIPTION OF THE DRAWING

The various novel features of this invention, along with the foregoing and other objects, as well as the invention itself, both as to its organization and method of operation, may be fully understood from the following description of illustrated embodiments when read in conjunction with the accompanying drawing, wherein.

DESCRIPTION OF A PREFERRED EMBODIMENT

Figure 1:
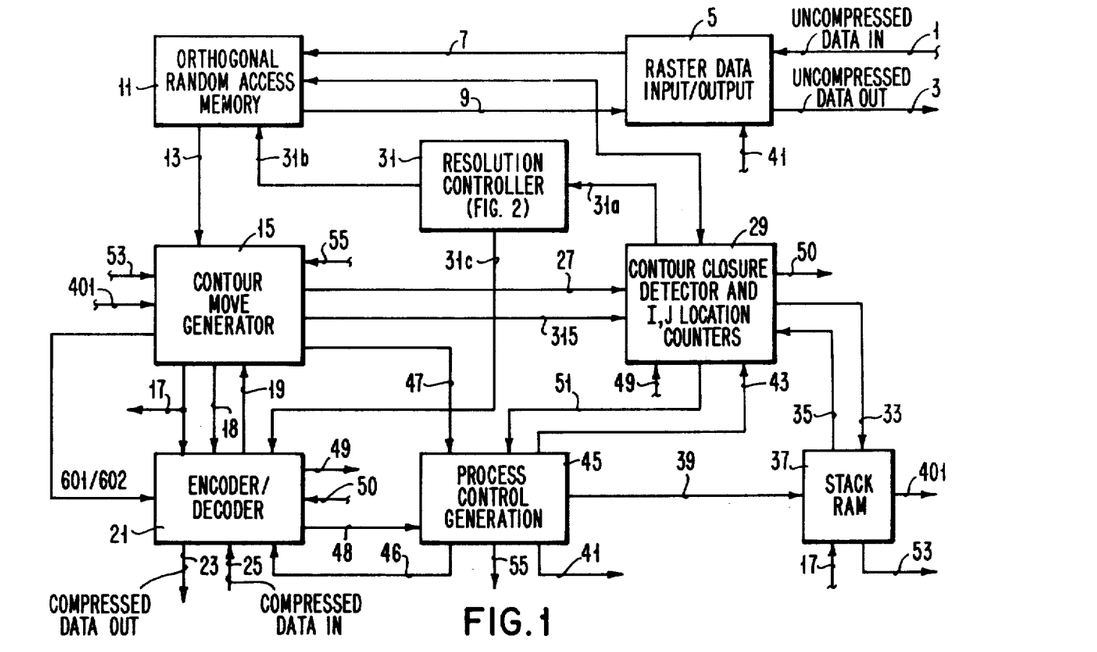
FIG. 1 shows a block diagram of the system logic and data flow among the principle elements of the contour apparatus.
Figure 2:
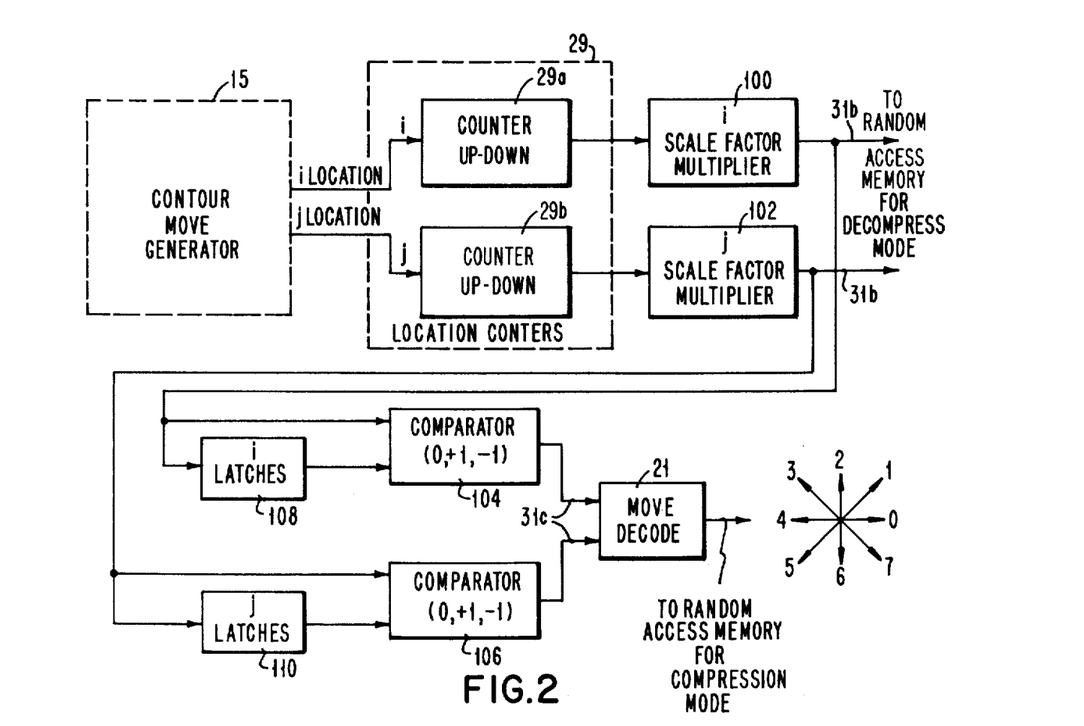
FIG. 2 shows a block diagram of the data flow of the contour resolution controller of FIG. 1.

In FIG. 1, the system logic and data flow among the principle elements of the contour compression/decompression apparatus is shown. A resolution controller 31 is shown interrupting an address data path 31a from a contour closure detector and $i,j$ location counters 29. The resolution controller directs signals on a lead 31b to address an orthogonal random access memory 11. The address data path 31b is taken to store the image data after a resolution change on a decompression mode into the random access memory 11. During a compression mode where uncompressed data is compressed according to a contour coding scheme of FIG. 1, the compressed data that has its resolution changed by the resolution controller is directed along the data lead 31c to an encoder/decoder 21. More complete apparatus for use as a resolution controller 31 is shown in FIG. 2. For a more complete description of the apparatus shown in FIG. 1 for the data compression utilizing boundary following of the exterior and interior borders of objects, reference is made to U.S. Pat. No. 3,987,412, previously mentioned in the prior art section.

The contour coding scheme of the U.S. Pat. No. 3,987,412 is incorporated herein for further explanation of a preferred embodiment of this invention and of FIG. 1. Briefly, in that patent, an image is defined as a 2-dimensional array of Boolean coded points, each point of which being representative of black/white pels. Clusters of black pels are perceived as objects, an object being characterized by a single outer contour closing upon itself and selectively containing inner contours circumscribing clusters of white pels being perceived as holes.

The method of the invention of that patent contemplates raster scanning and image array until a first black pel is ascertained. An initial array coordinate is thereupon recorded. At this juncture, the outer border of the object is encoded by a border follower. The border follower drives a cursor which encircles the object in a clockwise direction. The border follower records each black pel as it is encountered as a series of discrete differential azimuths in chain link encoded form. The recording continues until the object is encircled.

After searching for and locating the object and encoding its outer boundary, the inner boundaries of the object are located by complementing the Boolean value of each black pel as it is encountered such that the object is shrunk. The object is encircled as many times as it is necessary in order to reduce it to a single point.

A "border follower" is considered to be a mechanism by which a "cursor" moves from an object border point to a neighboring border point in a clockwise direction. The coordinate system is $i$-units left to right and $j$-units top to bottom. The follower, therefore, turns as sharply left as possible from the direction of the previous move subject to the constraint that it must move to a neighbor possessing the same brightness value.

A method of the patent encodes objects and whole boundaries of an arbitrary black/white image in chain length form. The method comprises four steps. These are:

1. Search for the object,
2. Record its boundary,
3. Shrink the object, and
4. Test for a hole.

Searching for objects in a two-dimensional array of image points is done in a row major order, left to right and top to bottom. An object has been found when a black picture element is encountered. The boundary of each found object is then encoded in chain length form as the border of the object is followed. The encoded data consists of the $i,j$ locations of the start point and a sequence of discrete moves from boundary point to neighboring boundary point. The encoding process is terminated for that boundary when the initial point is reencountered by the border follower.

After the object boundary is encoded, the object is shrunk by a continuation of the border following mechanism wherein each detectable element encountered is complemented. The border following mechanism, therefore, may make several trips around the border of the shrinking object. Occasionally, during the shrinking process, the presence of a possible hole is detected. If a hole has indeed been detected, the coordinates of the boundary of the hole is chain link encoded and the hole is dimensionally reduced.

After the original object has been dimensionally reduced to zero, implying that the memory storing the points at which mode change recently took place is empty, the next object is searched, again in row major order starting from the point where the first black pel was found. The image array is considered to be completely encoded when this raster search process has examined all image points. Contour coding is a description of the inner and outer borders of the objects in an image in a chain link form that is, a sequence of unit vectors. The resolution changing of the present invention is done in the contour coded data domain by the resolution controller 31.

Referring now to FIG. 2, the resolution changing mechanism of the resolution controller 31 takes place as the borders of the objects are written into the memory store. A pel is written into the memory store under the control of location counters 29 which are, in turn, under the control of the contour move generator 15. As described in the above referenced patent, the $i$ and $j$ coordinates of each successive move operate independently for storage. Thus, the $i$ and $j$ location points are directed to separate up-down counters 29a and 29b, respectively. The outputs of the up-down counters are directed to separate scale factor multipliers 100 and 102 for the $i$ and $j$ coordinates. The two orthogonal $i$ and $j$ coordinate directions can be changed independently by different ratios by selecting different input values to the scale factor multipliers. The ability to change the multiplier by different ratios is valuable for certain character generation applications and for compatibility of images scanned at non-square resolution parameters.

For the decompression mode, the outputs of the $i$ and $j$ multipliers 100 and 102 are directed to the random access memory store 11 via leads 31b.

For a compression mode, the output of the scale factor multipliers 100 and 102 are directed to separate $i$ and $j$ latches 108 and 110 and to one input of separate comparators 104 and 106. The output of the latches 108 and 110 form the second input to their respective comparator 104 and 106. The output of the comparators are directed via leads 31c to the move encoder 21 (see FIG. 1) for encoding of the new positions according to the contour coding scheme. The comparator such as the comparator 104 for the $i$ coordinate point compares the present coordinate point with the previous coordinate point stored in the $i$ latch 108. The comparator 104 senses either that the coordinate point is the same as the previous one, or is a move to the right in which case the $i$ coordinate will be one higher than the last one, or is a move to the left from the last pel and therefore the $i$ coordinate is one less than the last pel information. According to the requirements of the contour coding scheme, adjacent pels in a chain cannot be more than one pel away from the previous pel. The signal from the $i$ and $j$ comparators 104 and 106 are sensed by the move encoder 21 which sends out a code according to the direction of the next move as discussed in the aforementioned patent. Thus, the resolution controller 31 can accomplish a scale change either for a decompression mode to position the object image in a memory for display, or can accomplish a scale factor change upon the information received by scanning an image in a memory store for contour coding under a compression mode.

Figure 3:
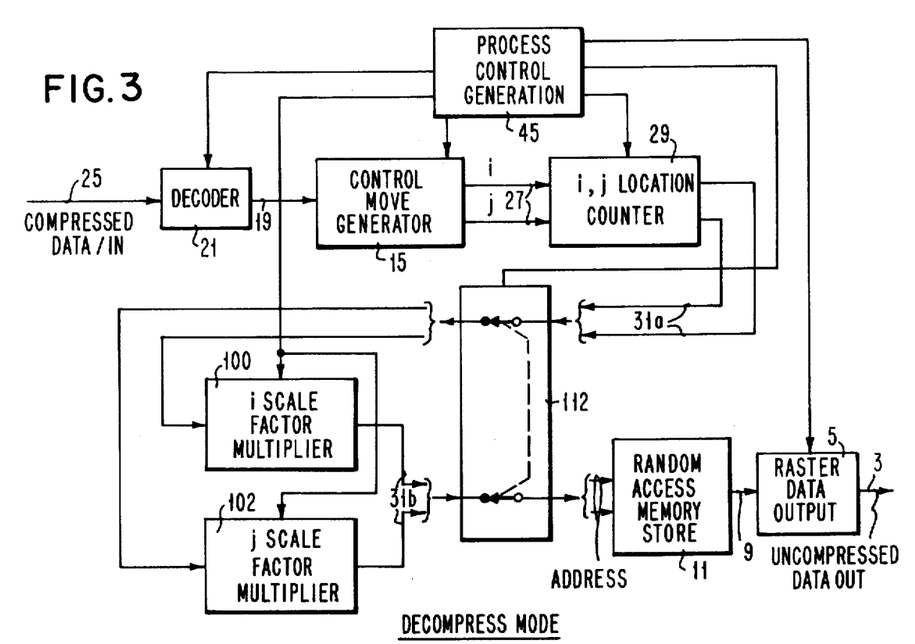
FIG. 3 shows a block diagram of the apparatus for the present invention for a decompress mode for already contour compressed image.

The apparatus for a decompress mode on compressed contour encoded image data is shown in FIG. 3. In FIG. 3, the compressed data input for display, for instance, is directed to the decoder 21 for decoding. The decoded move data is directed to the contour move generator 15 to change the coded data into the $i$ and $j$ coordinate information in the $i$ and $j$ location counters 29. The $i$ and $j$ coordinate information is directed along lines 31a to what is represented as a switch bus 112 where the coordinate information can either be directed to the scale factor multipliers 100 and 102 as shown with the switches in position of FIG. 3 or the $i$ and $j$ coordinate information can be directly bussed to the random access memory store 11 as address information. The information from the memory store 11 is directed to the raster data output 5 where uncompressed data output is directed to a display device, for instance. As shown in U.S. Pat. No. 3,987,412, the timing and operation of the apparatus is under control of a process control generation 45.

In the decompression mode of FIG. 3, the $i$ and $j$ coordinate address information is sent to the scale factor multipliers 100 and 102 in the form of object border locations to be reconstructed for storage and display. Thus, the only added apparatus for the decompress mode is the $i$ scale factor multiplier 100 for the $i$ coordinate address and the $j$ scale factor multiplier 102 for the $j$ coordinate address. The $i$ and $j$ coordinates are multiplied by any scale factor of less than one to shrink the original coordinate position according to the resolution size desired.

Figure 4:
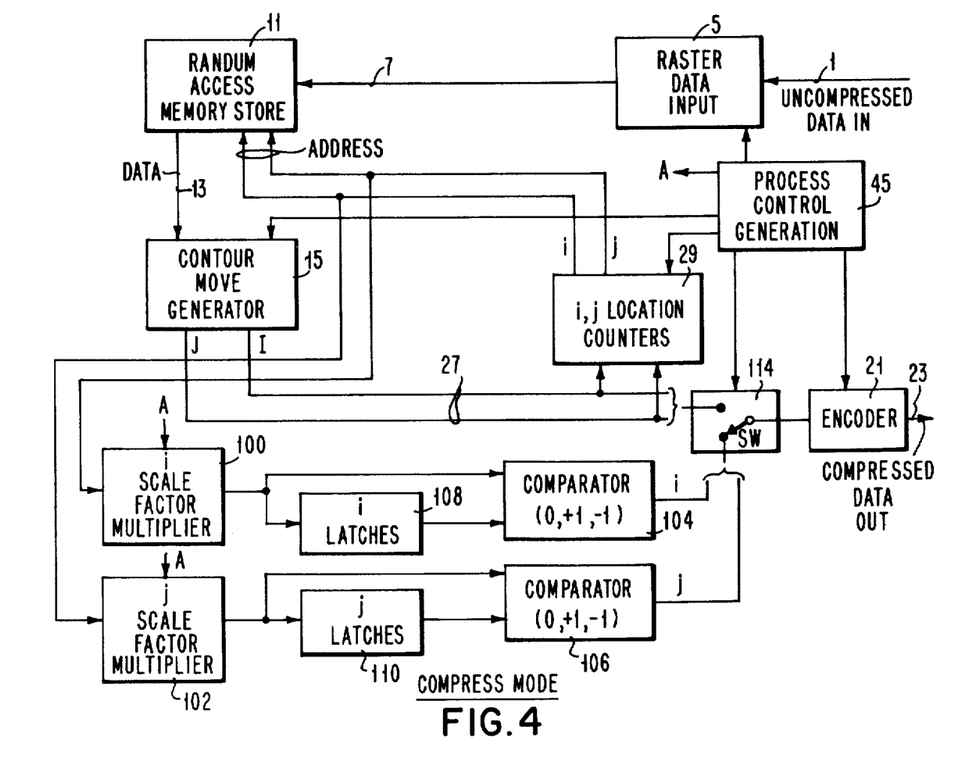
FIG. 4 shows a block diagram of the apparatus for the present invention for a compression mode of received image data.

Reference is made to FIG. 4 for the apparatus and data flow for a compression mode where the uncompressed image data is compressed and encoded to provide contour encoded compressed data output for storage or for direction to a display device for decompression and display. As shown in FIG. 4, the uncompressed data is directed to the raster data input 5 from lead 1.

The uncompressed data is directed along line 7 to the random access memory store 11 where the image data is stored. For compression the data is directed along line 13 to the contour move generator 15 which generates the moves according the $i$ and $j$ coordinates along lead 27 to the $i$ and $j$ location counters 29 and to a switch bus 114. The switch bus 114 represents the controls deciding whether the resolution size of the image is to be changed or whether the information is to be directed from the encoder 21 along line 23 as compressed data output. The $i$ and $j$ location counter output is the address to the random access store 11. For a resolution size change, the $i$ and $j$ address coordinate information from the $i$ and $j$ location counters 29 is directed to the scale factor multipliers 100 and 102, respectively, for the $i$ and $j$ coordinates. The $i$ and $j$ coordinates are multiplied by whatever scale factor is required and the multiplied coordinate is directed to the comparators 104 and 106 and to the $i$ and $j$ latches 108 and 110 where the next $i$ and $j$ coordinate position is determined. The outputs of the comparators are directed to the encoder 21 via the switch 114 where the coordinates are encoded according to the contour coding scheme and directed on line 23 as compressed data out.

Figure 5A:
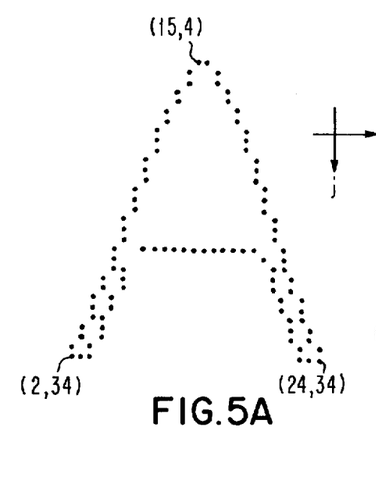
FIG. 5A and 5B illustrate the resolution changing concept between an original object and a reduced object in the contour chain of data according to the present invention.
Figure 5B:
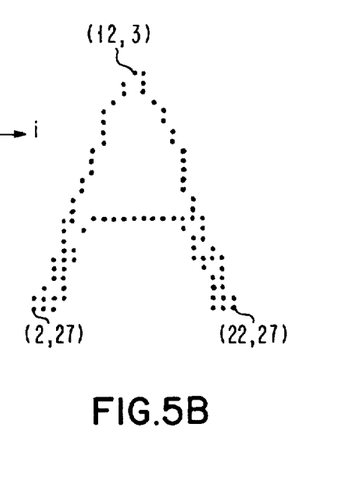

Reference is now made to FIGS. 5A and 5B and Table 1 for an example of a reduction from compressed data input to the new coordinate $i$ and $j$ positions and from the coordinates to a compressed data output with a size reduction. In FIG. 5A an original object border chain is developed from the compressed data output shown in column 1 of Table 1. The resulting coordinates after decoding in decoder 21 and generation of the $i$ and $j$ coordinates in the contour move generator 15 and the $i$ and $j$ location counter 29 is shown in column 2 of Table 1. Column 2 of Table 1 shows the figure as represented by the pels shown as black dots in FIG. 5A. The starting coordinate is marked as (15, 4) which is the $i$ and $j$ coordinates of a first pel encountered. The border following scheme follows the image of the FIG. 5A all around its outside border in a rough representation of the letter "A". In Table 1, the coordinates up to the position (28, 34) are shown. The remaining $i$ and $j$ coordinates and the remaining data input of the chain compression are left to the reader, it being sufficient to show these coordinates and, together with the aforementioned U.S. Pat. No. 3,987,412, the compressed data chain encoding and the resultant $i$ and $j$ coordinates can be determined.

For decompression and size reduction, see FIG. 3, the $i$ and $j$ coordinates are directed to the $i$ and $j$ scale factor multipliers 100 and 102 where the coordinates are reduced by multiplying both $i$ and $j$ by a scale factor of 0.8 for the present illustration. The reduced $i$ and $j$ coordinates are shown in the fourth column of Table 1 under the heading Reduced I, J. These points are shown in FIG. 5B with the originating point at coordinates (12, 3). The last point in column 4 of Table 1 represents the lower righthand corner of the object figure which has the coordinates (22, 27). Column 3 of Table 1 shows the difference between the previous and current reduction coordinates and stands for the comparison resulting in the output from the comparators 104 and 106 for a compression mode.

For the compression mode, the object image of FIG. 5A is to be reduced to the image of FIG. 5B and contour encoded into a compressed output information according to the apparatus of FIG. 4. In Table 1, for the compression mode, the coordinates $i$ and $j$ of column 2 are the coordinates of the original image of FIG. 5A with the comparison results of column 3 being the result of the output of the comparators 104 and 106, and the compressed output of column of 5 being the resultant output from the encoder 21 onto line 23. The reduction of the coordinates of the original pel (15, 4) is reduced to the coordinates (12, 3) by multiplying by the scale factor multipliers set at 0.8 in FIG. 4. According to the border following contour encoding scheme, this original coordinate point starts the compressed output string as shown in column 5 of Table 1.

For the compression mode of FIG. 4, the $i$ and $j$ signal leads from the $i, j$ location counters 29 scan the random access memory store 11 as its address looking for a black pel of the object. On finding the black pel, the contour move generator 15 starts the border following operation to obtain the contour string of data. The contour move generator 15 looks at the pel under observation and its surrounding pels to find the next move. The contour move generator 15 sends the next move to the encoder 21 via leads 27 and a switch 114. The switch 114 is symbolically shown for switching the data transferred to the encoder 21 either directly from the contour move generator or, if a size reduction is required, accepting the move information from the comparators 104 and 106. The contour move generator 15 also instructs the $i, j$ location counters 29 to access the next position of the random access memory store.

With the switch 114 set to encode resolution-changed compressed data, the $i$ and $j$ address signals from the $i, j$ location counters 29 are directed to the scale factor multipliers 100 and 102 as previously stated for FIG. 2. The scale factor multipliers can be set to any reduction figure. The reduced coordinate values are directed to its associated comparator 104 or 106 and its associated latch 108 or 110. The comparator compares the present pel $i$ and $j$ coordinates with the previous pel coordinates and sends the resulting move data via the switch 114 to be encoded in encoder 121 for utilization as compressed data.

Figure 6:
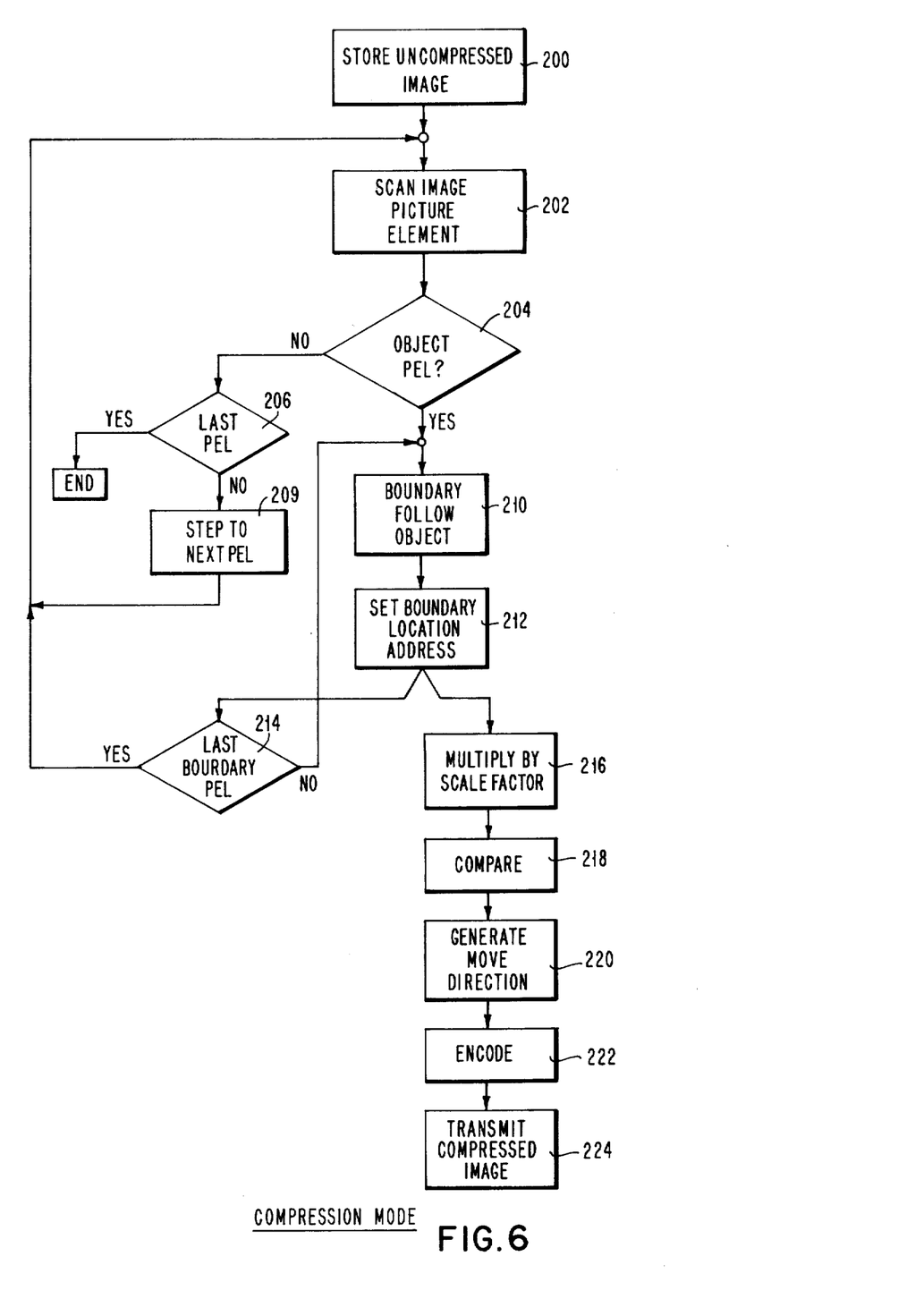
FIG. 6 illustrates a flow diagram for a contour compression according to the present invention.

A flow chart for the compression mode is shown in FIG. 6. In FIG. 6, the first block shows that the uncompressed image is stored and then scanned, picture element by picture element as shown in block 202. The information of the scanned picture elements are then sent to determine whether the pel is a black (object) pel or not as shown in the decision block 204. If the pel under observation is not an object pel, the next step in the flow chart is to check whether the pel is the last pel or not as shown in a decision block 206. If the pel under observation is a last pel, the process ends. If not, the flow continues to step to the next pel as shown in a block 208 and the flow returns to the block 202 to scan the image pel.

If the image pel is a black or object pel as determined in the decision block 204, the next block in the flow chart, block 210, shows that the object is boundary followed to set up the chain or contour coding. The flow continues to a block 212 where the boundary location addresses are set. In this step, the $i$ and $j$ coordinates of the object are stored. The flow continues to a decision block 214 to check for the last boundary pel. If the pel under observation is the last boundary pel of the contour chain, the flow returns to scan a next pel as shown in the block 202. If there is more boundary pels adjacent to the pel observation, the decision block 204 branches back to the block 210 where processing of the object is continued under a border following mode. At the same time that the pel is checked for whether it is the last boundary pel or not, the location address of the boundary from the block 212 is directed to the size resolution process which starts by multiplying by the scale factor as shown in a block 216. The scale factor multiplied coordinates are directed to a block 218 where the pel under observation is compared to the previous pel. The next step is to generate the move direction as shown in a block 220 and then to encode the move according to the contour coding scheme as shown in a block 222. The encoding chain is then transmitted as the compressed image as shown in a block 224.

Figure 7:
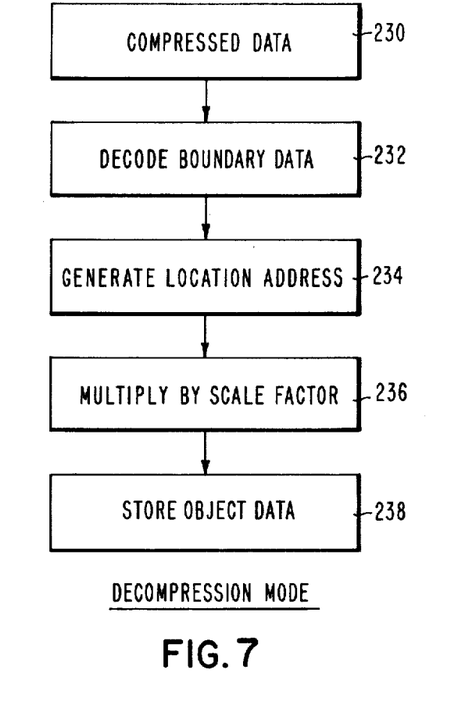
FIG. 7 shows a flow diagram for the decompression mode for contour encoded image data according to the present invention.

The flow for the decompression mode is shown in FIG. 7. In FIG. 7, the compressed data as shown in block 230 is decoded to obtain the boundary data as shown in block 232. Concurrently, as shown in a block 234, the location addresses are generated, reconstructing the *i* and *j* coordinates of the boundary cell. These *i* and *j* coordinates are next multiplied by a scale factor as shown in a block 236 and then transferred to a memory store to store the object data as shown in a block 238.

The principles of the present invention have now been made clear in an illustrative embodiment. There will be immediately obvious to those skilled in the art many modifications of structure, arrangement, proportions, the elements, materials and components used in the practice of the invention. For instance, the contour coding scheme as discussed in the present invention and referenced from U.S. Pat. No. 3,987,412 is merely illustrative of border following schemes that could be used with the present invention. The only criteria for the present invention is that the contour border following scheme produce a sequence of coordinates representing the object. The coordinates are then manipulated according to the size resolution of the present invention. The technique of the present invention is equally adaptable to any display or reproduction system since the resolution change and contour coding can be performed on any image in the memory store. Further, the present invention deals with resolution reduction, since a resultant contour chain that was larger than the original would have gaps in the border chains. Any resolution change can be accomplished with the present invention by first achieving a resolution increase by expanding a chain by an integer value and then reducing it to the desired size by the technique of the present invention. A method of enlarging a contour chain by its integer factor is to replace each move along the contour by N number of integer moves in the same direction. One skilled in the art can easily extend this integer expansion by a more sophisticated interpolation scheme without departing from the size reduction scheme of the present invention to accomplish any scale factor resolution change.

Representative apparatus usable for the latches 108 and 110 are the Hex/quadruple D-type Flip-Flops with Clear such as Texas Instrument Types SN54174 and sequel. Representative apparatus usable for the multiplier 100 and 102 are the 4-bit-by-4-bit Parallel Binary Multiplier such as Texas Instrument Types SN54284 and sequel. Representative apparatus usable for the comparators 104 and 106 are the 4-bit Magnitude comparators such as Texas Instrument Types SN5485 and sequel.

The appended claims are, therefore, intended to cover and embrace any such modification, within the limits only of the true spirit and scope of the invention.

TABLE 1

| DATA IN | I,J | I | J | REDUCED I,J | OUTPUT |
|---|---|---|---|---|---|
| 15,4 | 15,4 | 12 | 3 | 12,3 | 12,3 |
| 0 | 16,4 | +1 | 0 | 13,3 | 0 |
| 7 | 17,5 | 0 | +1 | 13,4 | 6 |
| 6 | 17,6 | 0 | +1 | 13,5 | 6 |
| 7 | 18,7 | +1 | +1 | 14,6 | 7 |
| 6 | 18,8 | 0 | 0 | 14,6 | — |
| 7 | 19,9 | +1 | +1 | 15,7 | 7 |
| 6 | 19,10 | 0 | +1 | 15,8 | 6 |
| 7 | 20,11 | +1 | +1 | 16,9 | 7 |
| 6 | 20,12 | 0 | +1 | 16,10 | 6 |
| 6 | 20,13 | 0 | 0 | 16,10 | — |
| 7 | 21,14 | +1 | +1 | 17,11 | 7 |
| 6 | 21,15 | 0 | +1 | 17,12 | 6 |
| 6 | 21,16 | 0 | +1 | 17,13 | 6 |
| 7 | 22,17 | 0 | 0 | 17,13 | — |
| 6 | 22,18 | 0 | +1 | 17,14 | 6 |
| 6 | 22,19 | 0 | +1 | 17,15 | 6 |
| 7 | 23,20 | +1 | +1 | 18,16 | 7 |
| 6 | 23,21 | 0 | +1 | 18,17 | 6 |
| 6 | 23,22 | 0 | +1 | 18,18 | 6 |
| 7 | 24,23 | +1 | 0 | 19,18 | 0 |
| 6 | 24,24 | 0 | +1 | 19,19 | 6 |
| 6 | 24,25 | 0 | +1 | 19,20 | 6 |
| 7 | 25,26 | +1 | +1 | 20,21 | 7 |
| 6 | 25,27 | 0 | +1 | 20,22 | 6 |
| 7 | 26,28 | +1 | 0 | 21,22 | 0 |
| 6 | 26,29 | 0 | +1 | 21,23 | 6 |
| 6 | 26,30 | 0 | +1 | 21,24 | 6 |
| 7 | 27,31 | 0 | +1 | 21,25 | 6 |
| 6 | 27,32 | 0 | +1 | 21,26 | 6 |
| 7 | 28,33 | +1 | 0 | 22,26 | 0 |
| 6 | 28,34 | 0 | +1 | 22,27 | 6 |

I claim:

1. Apparatus for resolution changing objects in a black and white image, the objects being patterned black picture elements stored in a bit addressable random access memory store, said apparatus comprising:
   means for accessing the image in the memory store in a predetermined sequential order;
   means for indicating memory coordinates of each picture element in encountered objects of the image accessed from the memory store;
   border follower means responsive to said accessing means for following the connected picture elements of the borders of the object;
   multiplier means for scale factor multiplying the memory coordinates of each picture element of the encountered objects; and
   encoder means responsive to said following means for encoding the relative position of each picture element according to its multiplied memory coordinates into a machine usable coded format of the resolution changed object.

2. Apparatus for resolution changing objects as defined in claim 1 wherein said encoder means includes:
   latch means for storing the scale factor multiplied memory coordinates of a picture element; and
   comparator means for comparing the multiplied memory coordinates of the present picture element to those of the immediately previous picture element stored in said latch means, said comparator means providing the memory coordinates for encoding into the machine usable coded format.

3. Apparatus for resolution changing objects in a black and white image, the objects being patterned black picture elements stored in a bit addressable random access memory store, said apparatus comprising:
   means for accessing the image in the memory in a predetermined sequential order, including means for indicating that an initial black picture element of an object has been encountered;

means responsive to said accessing means for following the outer border of said object to encounter successive neighboring black picture elements, means for indicating the memory coordinates of said black picture elements retrieved by said accessing means;

multiplier means for scale factor multiplying the memory coordinates of each black picture element of said object;

means connected to said multiplier means for indicating the relative position of each successive black picture element encountered;

means responsive to said following means for encoding the relative position of each picture element in a machine usable coded format; and control means connected to said memory, responsive to said following means for changing each encountered black picture element to white to thereby shrink and delete said object from said memory;

said control means including means connected to said encoding means, responsive to said following means for deactivating said encoding means upon said follower reencountering said initial black picture elememt to thereby de-limit the outer boundary of the object.

4. Apparatus for resolution changing objects in a black and white image, the objects being patterned black picture elements stored in a bit addressable random access memory store, the apparatus including:

means for accessing the image in the memory in a predetermined sequential order, including means for indicating that an initial black picture element of an object has been encountered;

means responsive to said accessing means for following the outer border of said object to encounter successive neighboring black picture elements, address indication means for indicating the memory coordinates of said black picture elements retrieved by said accessing means;

position indicator means for indicating the relative position of each successive black picture element encountered;

means responsive to said following means for encoding the relative position of each picture element in a machine usable coded format; and control means connected to said memory, responsive to said following means for changing each encountered black picture element to white to thereby shrink and delete said object from said memory;

said control means including means connected to said encoding means, responsive to said following means for deactivating said encoding means upon said follower reencountering said initial black picture element to thereby de-limit the outer boundary of the object;

wherein the improvement comprises:

multiplier means connected to said address indicator means for scale factor mutliplying the memory coordinates of each black picture element of said object;

latch means connected to said multiplier means for storing the multiplied memory coordinates of one picture element; and comparator means for comparing the multiplied memory coordinates of the immediately previous picture element stored in said latch means to the multiplied memory coordinates of the present picture element, said comparator means providing the memory coordinates for said position indicator means.

5. Apparatus for resolution changing objects in a black and white image from contour encoded data for storage in a bit addressable random access memory store, said apparatus comprising:

decoder means for decoding the contour encoded data into memory store coordinates identifying each picture element of the objects in the image;

multiplier means for scale factor mutliplying the memory store coordinates; and means for storing the image in the memory store according to the multiplied memory store coordinates of the objects in the image.

6. Apparatus for resolution changing objects as defined in claim 5 wherein said decoder means includes integer expansion means for providing $n$ number of integer steps according to the contour encoded data to produce $n$ number of picture elements and its memory store coordinates for each picture element of the objects in the image.

7. A machine implementable process for changing resolution of boundary following contour encoded compressed objects information of a black and white image, the objects being patterned black picture elements, said process comprising the steps of:

decoding the boundary encoded compressed object information;

generating coordinates for the location address from the decoded boundary object information;

multiplying the generated coordinates by a scale factor; and storing the object data using the multiplied coordinates as the address location of black picture elements of the objects of the image.

8. A machine implementable process for changing resolution while compressing and encoding objects and hole boundaries in chain link coded form of an arbitrary black/white image composed of black and white picture elements comprising the steps of:

storing the image in a multi-dimensional writable memory;

searching said memory for black objects an object being identified when the first black picture element of a plurality of black picture elements comprising said object is encountered;

border following said object to thereby encounter successive black picture elements comprising the outer boundary of said object;

generating coordinates for the location address from the encountered black picture elements;

multiplying the generated coordinates by a scale factor;

activating an encoder in order to encode the coordinates of said encountered picture elements as the border of the object is followed until said first black picture element is reencountered;

deactivating said encoder;

changing from black to white in said multi-dimensional memory, picture elements corresponding to said encountered picture elements thereby reducing the object in order to locate inner boundaries and for eliminating the object from further consideration by reducing it to either a single point or until a white border picture element adjacent to an encountered black picture element indicative of a hole within the object is encountered.

generating coordinates for the location address from the encountered white picture elements;

multiplying the generated coordinates by a scale factor;

reactivating said encoder in order to encode the X-Y coordinates of said encountered white picture elements of said hole as the border of said hole is followed until the coordinates of the initially encountered white border picture element are re-encountered;

deactivating said encoder; and reducing the white picture element values within the inner boundary as if the hole were a black object, the processing being recursive until the original object is in turn reduced to a single picture element.

9. A machine implementable method for changing resolution while compressing and encoding objects and hole boundaries in chain link coded form of an arbitrary black/white image composed of black and white picture elements comprising the steps of:

storing the image in a multi-dimensional writable memory;

searching said memory in row major order for black objects, an object being identified when the first black picture elements of a plurality of black picture elements comprising said object is encountered;

border following said object to thereby encounter successive black picture elements comprising the boundaries of said object;

generating coordinates for the location address from the encountered black picture elements;

multiplying the generated coordinates by a scale factor; and encoding the coordinates of said encountered picture elements as the borders of the object are followed.

10. A machine implementable process for changing resolution while boundary encoding of a two-dimensional array of picture elements, each picture element of which exhibits a Boolean value representative of black or white such that connected clusters of black picture elements are perceived as objects, and, further, such that each object possesses a single outer contour closing upon itself, and, lastly, such that each object selectively contains inner contours circumscribing clusters of white picture elements perceived as holes, the method comprising the steps of:

(a) storing the array in a multi-dimensional writable memory;

(b) raster scanning the array until the first black picture element of a plurality of picture elements comprising an object is encountered;

(c) going to step (g) if an object picture element is encountered, otherwise going to step (d);

(d) ending the process if the encountered picture element is the last picture element, otherwise going to step (e);

(e) going to the next picture element of the stored image;

(f) returning to step (b);

(g) border following said object to thereby encounter successive black picture elements comprising the outer boundary of said object;

(h) generating location address of the boundary of the object;

(i) going to step (j) to continue boundary following object and to step (k) for the outputting of data;

(j) going to step (b) if the picture element being scanned is the last picture element of the boundary, otherwise going to step (g).

(k) multiplying the generated location address by a scale factor to change the resolution of the object;

(l) comparing the present multiplied location address with the previous multiplied location address;

(m) generating a new location address according to the scale factor multiplication and the comparison;

(n) encoding the generated new location address of said encountered picture elements; and (o) transmitting the encoded new location address to a utilization device.

11. A machine implementable process for changing resolution of boundary following contour encoded compressed object data information of an image comprising the steps of:

(a) decoding the contour encoded compressed boundary information representing objects of the image;

(b) generating the coordinates of the location addresses of the picture elements of the objects of the decoded boundary information;

(c) multiplying the generated coordinates by a scale factor to change the resolution of the object; and (d) storing the resolution changed information according to the multiplied coordinates of the location address in a random access memory store to obtain the changed resolution black/white image composed of black and white picture elements placed according to the contour encoded image information.

* * * * *